US009348438B2

(12) United States Patent
Schuckle et al.

(10) Patent No.: US 9,348,438 B2

(45) Date of Patent: May 24, 2016

(54) ADVANCED IN-CELL TOUCH OPTICAL PEN

(71) Applicants: Richard William Schuckle, Austin, TX (US); Rocco Ancona, Austin, TX (US); Roy W. Stedman, Austin, TX (US)

(72) Inventors: Richard William Schuckle, Austin, TX (US); Rocco Ancona, Austin, TX (US); Roy W. Stedman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 17 days.

(21) Appl. No.: 13/770,130

(22) Filed: Feb. 19, 2013

(65) Prior Publication Data

US 2014/0232693 A1 Aug. 21, 2014

(51) Int. Cl.

*G06F 3/033* (2013.01)
*G06F 3/038* (2013.01)
*G06F 3/041* (2006.01)
*G06F 3/042* (2006.01)
*G06F 3/0354* (2013.01)

(52) U.S. Cl.

CPC .......... *G06F 3/0386* (2013.01); *G06F 3/03545* (2013.01); *G06F 3/042* (2013.01); *G06F 3/0418* (2013.01)

(58) Field of Classification Search

CPC ..... G06F 3/042; G06F 3/0421; G06F 3/0425; G06F 3/0304; G06F 3/0428; G06F 3/017; G06F 3/0416; G06F 3/041

USPC ............... 345/104, 156, 173–283; 178/18.01, 178/18.09, 18.11, 19.05

See application file for complete search history.

(56) References Cited

U.S. PATENT DOCUMENTS

| | | | | |
|---|---|---|---|---|
| 4,883,926 | A * | 11/1989 | Baldwin | 178/19.01 |
| 7,257,255 | B2 * | 8/2007 | Pittel | 382/187 |
| 2005/0104870 | A1 | 5/2005 | Jurisch et al. | |
| 2005/0110781 | A1 * | 5/2005 | Geaghan et al. | 345/180 |
| 2005/0156915 | A1 * | 7/2005 | Fisher | 345/179 |
| 2008/0066973 | A1 * | 3/2008 | Furuki | 178/19.04 |
| 2009/0167728 | A1 | 7/2009 | Geaghan et al. | |
| 2010/0328272 | A1 | 12/2010 | Craven-Bartle et al. | |
| 2011/0090179 | A1 * | 4/2011 | Lai et al. | 345/179 |
| 2012/0206349 | A1 | 8/2012 | Nowatzyk et al. | |

OTHER PUBLICATIONS

International Search Report and Written Opinion; PCT/US2014/013974; pp. 10, Apr. 25, 2014.

PCT International Preliminary Report on Patentability of PCT/US2014/013974 filed Jan. 31, 2014, dated Aug. 25, 2015, 5 pages.

* cited by examiner

*Primary Examiner* — Olga Merkoulova

(74) *Attorney, Agent, or Firm* — Baker Botts L.L.P.

(57) ABSTRACT

A user input device communicatively coupled to a memory is disclosed. The user input device may include a user-manipulated portion; a surface contact portion of the user-manipulated portion, the surface contact portion disposed at an end of the user-manipulated portion; a first light source contained substantially within the user-manipulated portion, the first light source emitting light through the surface contact portion; a user input detector at an external surface of the user-manipulated portion; and an optical receiver at an external surface of the user-manipulated portion, the optical receiver configured to communicate a plurality of data associated with an object external to the user input device to the memory.

15 Claims, 4 Drawing Sheets

400

FIRST USER INPUT DETECTED? 402 — NO / YES

ACQUIRE AND STORE EXTERNAL DATA ASSOCIATED WITH STYLUS 404

INDICATE SUCCESSFUL DATA CAPTURE 406

SECOND USER INPUT DETECTED? 408 — NO / YES

THIRD USER INPUT DETECTED? 410 — NO / YES

TRANSMIT DATA TO IHS COMPONENTS 412

INDICATE SUCCESSFUL DATA TRANSMISSION 414

ADVANCED IN-CELL TOUCH OPTICAL PEN

TECHNICAL FIELD

This invention relates generally to the field of information handling systems and more specifically to a user input device for interfacing with an information handling system.

BACKGROUND

As more and more information handling systems become available, more users may attempt to use those information handling systems in a variety of ways. Typical methods of interacting with information handling systems have included a keyboard, mouse, touch screen, and/or stylus, among many others. As information handling systems become integrated into, and/or take the place of, older types of electronic devices, users have begun to expect more from the interaction between user and information handling system. Certain interaction devices may be limited in the functionality they can provide, in addition to limitations to a user's experience. Interaction devices may vary in the types of functionality they can provide.

SUMMARY OF THE DISCLOSURE

In accordance with certain embodiments of the present disclosure, a user input device communicatively coupled to a memory is disclosed. The user input device may include a user-manipulated portion; a surface contact portion of the user-manipulated portion, the surface contact portion disposed at an end of the user-manipulated portion; a first light source contained substantially within the user-manipulated portion, the first light source emitting light through the surface contact portion; a user input detector at an external surface of the user-manipulated portion; and an optical receiver at an external surface of the user-manipulated portion, the optical receiver configured to communicate a plurality of data associated with an object external to the user input device to the memory.

In accordance with certain embodiments of the present disclosure, an information handling system for capturing user input is disclosed. The information handling system may include processor; a memory; a cover surface; a display surface; a plurality of optical sensors coupled to the display surface; and a user input device configured to be in contact with the cover surface. The user input device may include a first light source emitting a first light, the first light configured to activate one or more of the plurality of optical sensors; a second light source emitting a second light, the second light configured to activate one or more of the plurality of optical sensors; and an optical receiver configured to communicate to the memory a plurality of data associated with an object external to the user input device.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Preferred embodiments and their advantages are best understood by reference to FIGS. 1 through 4, wherein like numbers are used to indicate like and corresponding parts.

For the purposes of this disclosure, an information handling system ("IHS") may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The IHS may include memory, one or more processing resources, such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The IHS may also include one or more buses operable to transmit communication between the various hardware components.

One type of device that may advance interaction between a user and an information handling system is a stylus. Typically, a stylus may take the shape of a pen or pen-shaped object that may allow a user to, for example, simulate on an information handling system the act of "writing" on a sheet of paper. A stylus may also be used as a pointing device, selection device, input device, and/or to perform other functions required by a user of an information handling system.

Figure 1:
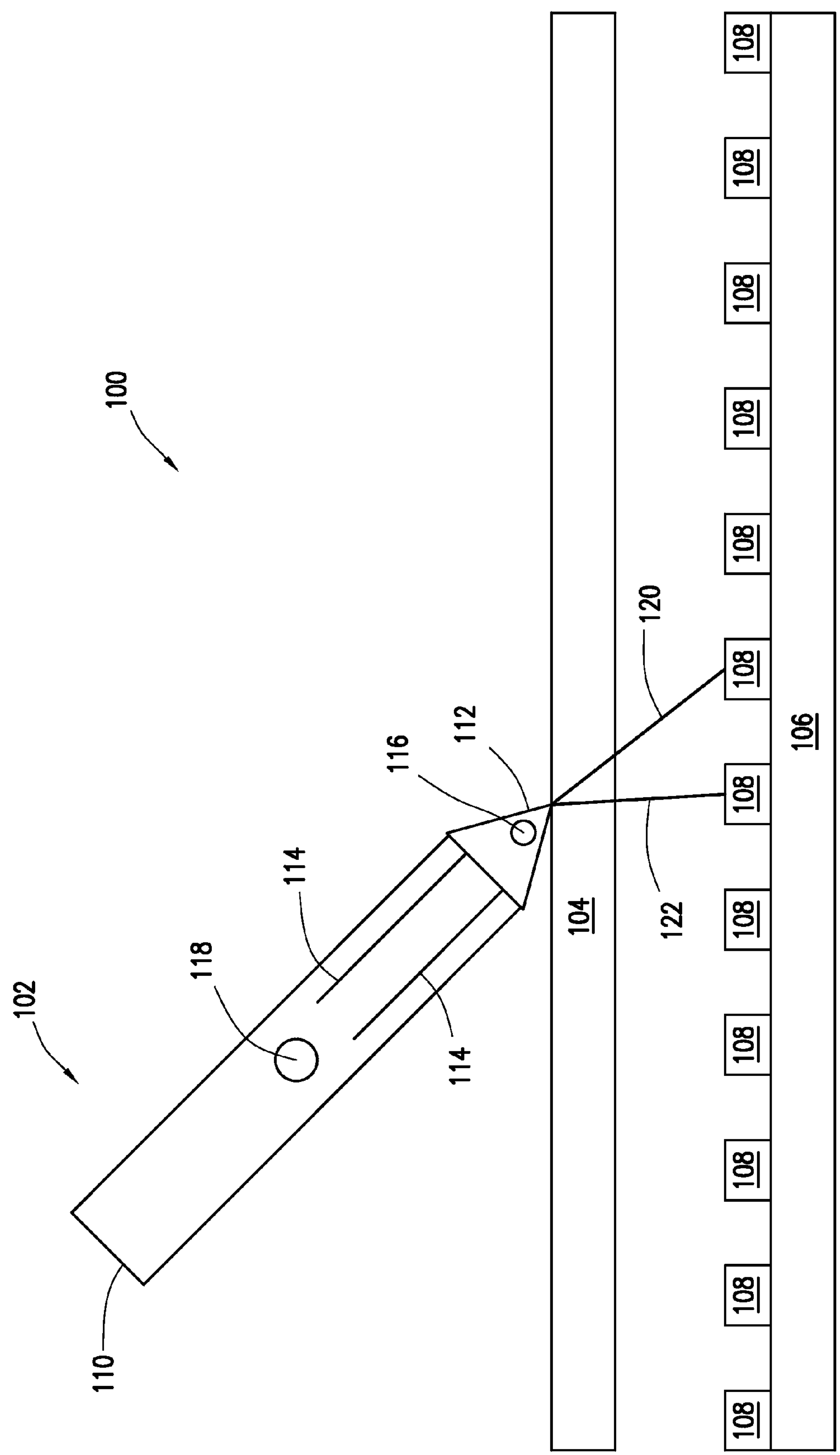
FIG. 1 illustrates an example information handling system for implementing a stylus with two active light sources, in accordance with certain embodiments of the present disclosure.

FIG. 1 illustrates an example information handling system ("IHS") 100 for implementing a stylus 102 with two active light sources 114, in accordance with certain embodiments of the present disclosure. In some embodiments, IHS 100 may include stylus 102, cover surface 104, display surface 106, and a plurality of optical sensors 108. In some embodiments, cover surface 104 and display surface 106 may be part of an electronic device with which a user may desire to interact. For example, cover surface 104 and display surface 106 may be part of a desktop computer, laptop computer, tablet computer, cellular telephone, personal digital assistant, or other electronic device configured to accept user interaction through stylus 102.

In some embodiments, stylus 102 may include a user-manipulated portion 110, and/or a surface contact portion 112. Although depicted as two separate portions for ease of illustration and discussion, in some embodiments, user-manipulated portion 110 and surface contact portion 112 may be integrated into a single portion of stylus 102 without departing from the scope of the present disclosure. Further, stylus 102 may include more or fewer portions than user-manipulated portion 110 and surface contact portion 112 without departing from the scope of the present disclosure.

In some embodiments, stylus 102 may also include one or more light source(s) 114. Light source 114 may be any appropriate light source configured to allow interaction between a user of stylus 102 and information handling system 100. For example, light source 114 may be a laser configured to be modulated and/or frequency shifted, as described in more detail below with reference to FIGS. 2-4. As another example, light source 114 may be a divergent light source. In some configurations of information handling system 100, differences in the properties of light received by optical sensors 108 and/or transmitted by light source 114 may be used to communicate information, as described in more detail below with reference to FIGS. 2-4.

In some embodiments, stylus 102 may include a plurality of light sources 114. For example, stylus 102 may include a first light source 114 that includes a laser for communicating certain types of information to other components of information handling system 100 and a second light source 114 that includes a divergent light source for communicating other types of information to other components of information handling system 100. For example, the divergent light source may be a "tip light" visible to a user of information handling system 100 that may indicate certain modes of operation, may indicate the presence of stylus 102 in contact with surface content portion 112, and/or may be used for communicating other types of information to other components of information handling system 100.

In some embodiments, stylus 102 may also include optical receiver 116 configured to receive light into the stylus for processing. For example, as described in more detail below with reference to FIGS. 2-4, stylus 102 may be configured to receive information related to colors, textures, and/or other properties of other objects. This data may be processed by stylus 102 and/or communicated to other components of information handling system 100 for processing.

In some embodiments, stylus 102 may also include user input detector 118 configured to receive and/or process data associated with a user and his/her/its interaction needs. For example, user input detector 118 may be configured to receive a radio frequency ("RF") signal from other components of information handling system 100. Such a signal may be used in some configurations to provide control signals to stylus 102 (e.g., to change parameters associated with light source 114). As another example, user input detector 118 may be configured to receive an optical signal from other components of information handling system 100. Such a signal may be used in some configurations to provide control signals to stylus 102 (e.g., to change parameters associated with light source 114).

As a further example, user input detector 118 may be configured to receive data associated with a user's use of stylus 102. For example, user input detector 118 may include a pressure sensor that may be configured to detect an amount of pressure applied to user-manipulated portion 110 of stylus 102. In such configurations, user input detector 118 may analyze such data to alter performance of stylus 102. For example, a user may apply pressure to stylus 102 in order to activate certain operation modes (e.g., an "eyedropper mode" described in more detail below with reference to FIG. 4.) and/or change parameters associated with other components of information handling system 100 including, for example, light source 114.

In some embodiments, display surface 106 may include a plurality of optical sensors 108. In some configurations of information handling system 100, optical sensors 108 may be arranged within and/or upon display surface 106 in any appropriate manner configured to suitably appreciate user interactions through stylus 102. For example, optical sensors 108 may be arranged in a grid pattern wherein the shapes of individuals optical sensors 108 and spacing between and among optical sensors 108 have been chosen to provide a desired level of granularity to the interaction mechanisms of stylus 102, as described in more detail below with reference to FIGS. 2-4.

In some embodiments, optical sensors 108 may be configured to determine one or more characteristics of stylus 102. For example, optical sensors 108 may be configured to determine whether a light emitted from stylus 102 is incident upon optical sensor 108. As another example, optical sensors 108 may be configured to determine whether surface contact portion 112 of stylus 102 is incident upon display surface 106. In some configurations, this may be done by determining whether a shadow cast by surface contact portion 112 reaches one or more optical sensors 108. In the same or alternative configurations, this may be done by analyzing the presence of light from one or more light source(s) 114 of stylus 100 as described in more detail above.

In the illustrative example of FIG. 1, optical sensors 108 may detect first light path 120. In some configurations, first light path 120 may describe a path taken by light incident from a first light source 114. Optical sensors 108 may also be configured to detect second light path 122. In some configurations, second light path 122 may describe a path taken by light incident from a second light source 114. For example, first light path 120 may describe a path taken by a laser emitted from stylus 102 while second light path 122 may describe a path taken by a tip light emitted from stylus 102. As another example, second light path 122 may describe the location of a "shadow" made by surface contact portion of 112 on optical sensors 108.

In the illustrative example of FIG. 1, first light path 120 may be incident on a first optical sensor 108 and second light path 122 may be incident on a second optical sensor 108. Using the distance between the two optical sensors 108, information handling system 100 may be configured to calculate an incidence angle between surface contact portion 112 of stylus 102 and display surface 106 of information handling system 100.

In operation, a user of information handling system 100 may select a mode of operation for stylus 102 as described in more detail below with reference to FIGS. 2-4. The user may then operate stylus by manipulating one or more of user-manipulated portion 110, surface contact portion 112, and/or user input detector 118 in order to communicate information to other components of information handling system 100. For example, a user may grasp in his/her hand user-manipulated portion 110 of stylus 102 and place surface contact portion 112 in contact with display surface 106. The user may use stylus 102 to, for example, input data to information handling system 100 through brush- and/or stroke-type inputs through movements of surface contact portion 112 over display surface 106. Light emitted by one or more light source(s) 114 may pass through display surface 106 and be incident upon one or more optical sensors 108. Information handling system 100 may use data gleaned from the incidence of light upon one or more optical sensors 108 in order to determine the type(s) of input created by a user through the use of stylus 102. For example, information handling system 100 may use angle information to determine what type of stroke a user made using stylus 102. As another example, information handling system 100 may use angle information to adjust data displayed to a user in order to reduce undesired parallax effects. In addition to angle information, stylus 102 may communicate data associated with certain functionality associated with stylus 102, as described in more detail below with reference to FIGS. 2-4.

Figure 2:
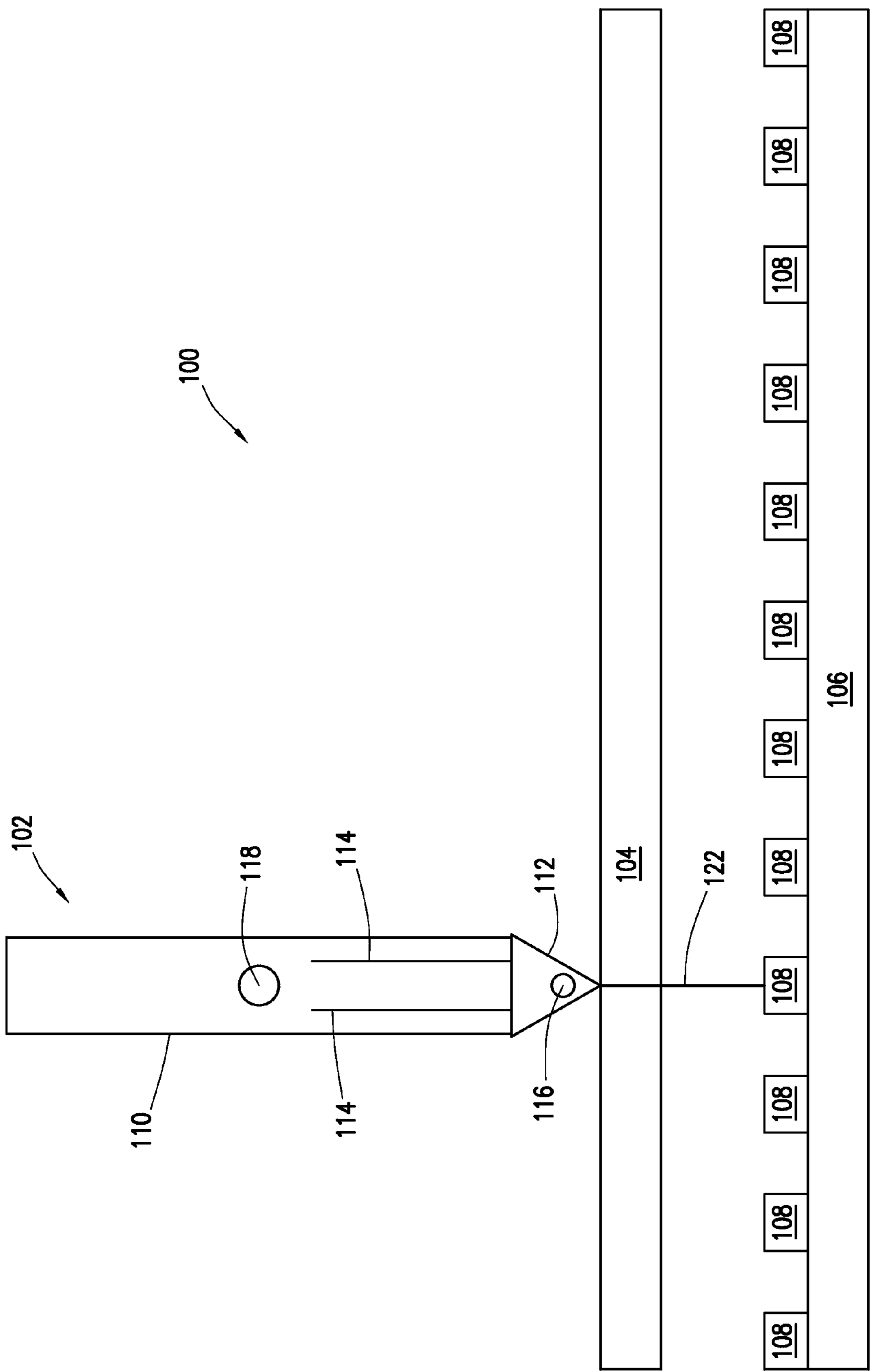
FIG. 2 illustrates an example information handling system for implementing a stylus with a second active light source, in accordance with certain embodiments of the present disclosure.

FIG. 2 illustrates an example IHS 100 for implementing a stylus 102 with a second active light source 114, in accordance with certain embodiments of the present disclosure. In some embodiments, IHS 100 may include stylus 102, cover surface 104, display surface 106, and a plurality of optical sensors 108. In the illustrative example of FIG. 2, light source 114 includes a divergent light source that may emit light in the visible spectrum. Such a "tip light" may be visible to a user of stylus 102 in order to communicate to a user, for example, the selected mode of operation of stylus 102. For example, light source 114 may emit a pink light when stylus 102 has been selected to be in an erase mode (e.g., to deleted data associated with an electronic document currently displayed by information handling system 100), a yellow light when stylus 102 has been selected to be in a highlight mode (e.g., to highlight data associated with an electronic document currently displayed by information handling system 100), and/or a blue light when stylus 102 has been selected to be in a compose mode (e.g., to enter data associated with an electronic document currently displayed by information handling system 100). Stylus 102 may be configured to reflect other modes of operation and/or additional information through the use of light source 114. For example, a compose mode may include a plurality of "ink colors" that may be reflected in by light source 114 (e.g., red for text entry with a red font color, blue for a blue font color, etc.).

In some embodiments, the operational mode of stylus 102 may be determined at least in part by user input detector 118, as described in more detail above with reference to FIG. 1. For example, a user may apply a certain amount of pressure to change an operational mode. As another example, user input detector 118 may be configured to receive an RF and/or optical signal from other components of information handling system 100 in order to change operational modes. Incidence of surface contact portion 112 of stylus 100 with display surface 106 may also be used to communicate information associated with an operational mode of stylus 102, as described in more detail below with reference to FIG. 3.

Figure 3:
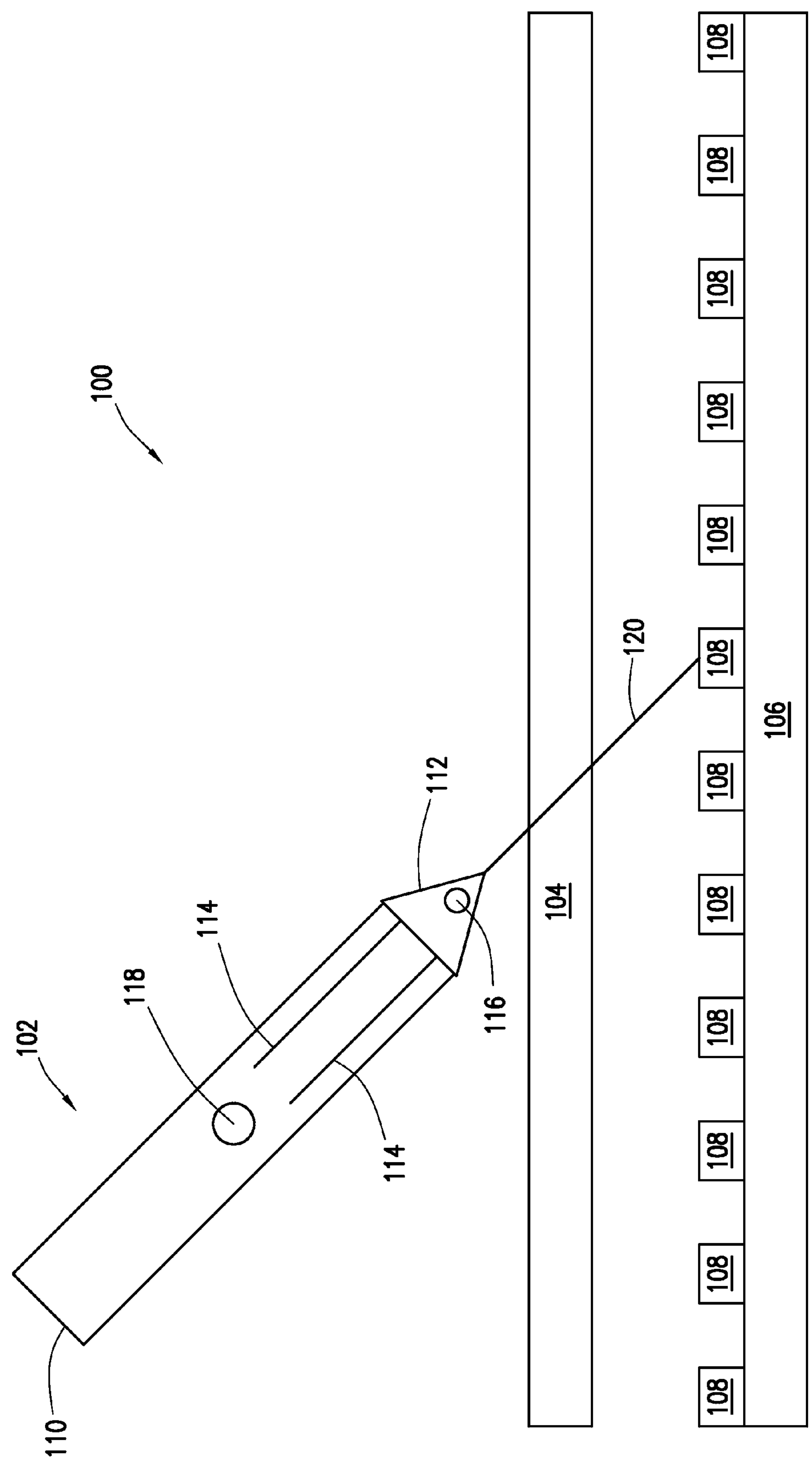
FIG. 3 illustrates an example information handling system for implementing a stylus with a first active light source, in accordance with certain embodiments of the present disclosure.

FIG. 3 illustrates an example IHS 100 for implementing a stylus 102 with a first active light source 114, in accordance with certain embodiments of the present disclosure. In some embodiments, IHS 100 may include stylus 102, cover surface 104, display surface 106, and a plurality of optical sensors 108. In the illustrative example of FIG. 3, light source 114 may include a laser light source. In such an example, light from light source 114 may be used to communicate data to other components of information handling system 100, as described in more detail above with reference to FIG. 1. In some configurations of information handling system 100 and stylus 102, there may be no shadow of surface content portion 112 of stylus 102 incident on one or more optical sensors 108. In the same or alternative configurations of information handling system 100 and stylus 102, there may be no "tip light" and/or other secondary light source incident on one or more optical sensors 108.

In some embodiments, the lack of non-laser light incident on one or more optical sensors 108 may indicate that stylus 102 is not in contact with display surface 106 of information handling system 100. For example, a user of stylus 102 may be using stylus 102 in a "hover" mode, or an operational mode in which contact between surface contact portion 112 of stylus 102 and display surface 106 is not desired. In some configurations of information handling system 100, this "hover" mode may be used for, among other things, changing the operational mode of stylus 102, gathering information from other sources, recharging a power source for stylus 102, and/or other appropriate uses of stylus 102 that may not require contact between surface contact portion 112 of stylus 102 and display surface 106. One example of external data gathering may be an "eyedropper" mode, as described in more detail below with reference to FIG. 4.

Although the examples depicted in FIGS. 1-3 describe certain features of stylus 102, more, fewer, or different features may be present within or associated with stylus 102 without departing from the scope of the present disclosure. For example, stylus 102 may include other components, including optical, mechanical, or other mechanisms configured to perform other functions associated with stylus 102. For instance, stylus 102 may be configured to support digitizers and/or other character recognition systems. As a further example, stylus 102 may be configured to support traditional writing mechanisms (e.g., ink).

Figure 4:
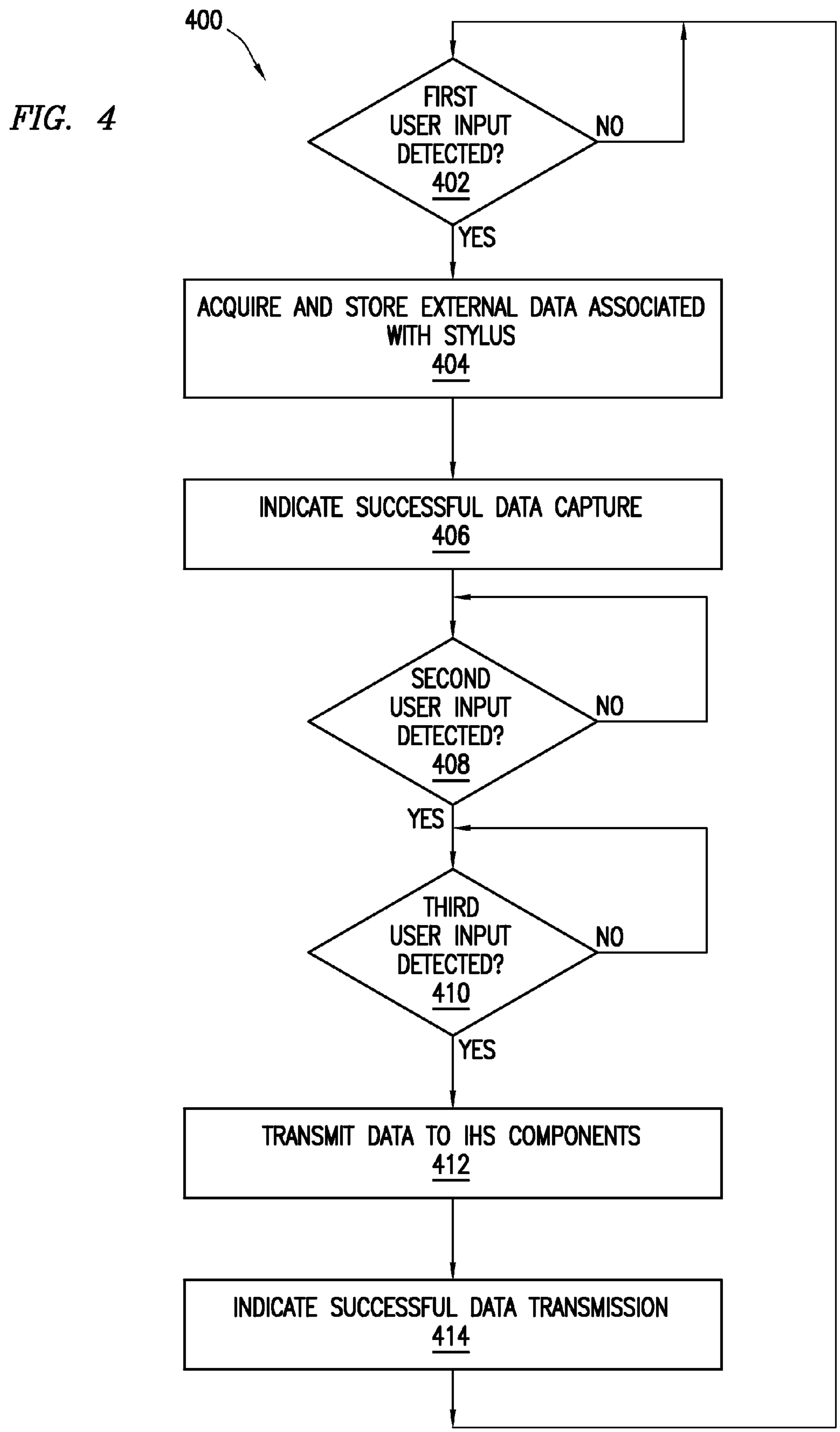
FIG. 4 is a flowchart of an example method for operating a stylus in an eyedropper mode, in accordance with certain embodiments of the present disclosure.

FIG. 4 is a flowchart of an example method 400 for operating stylus 102 in an eyedropper mode, in accordance with certain embodiments of the present disclosure. Method 400 may include selecting a user input mode, indicating data capture, and transmitting appropriate data to other components of information handling system 100.

According to one embodiment, method 400 preferably begins at step 402. Teachings of the present disclosure may be implemented in a variety of configurations. As such, the preferred initialization point for method 400 and the order of steps 402-414 comprising method 400 may depend on the implementation chosen.

At step 402, method 400 may determine whether a first type of user input has occurred. In some embodiments, as described in more detail above with reference to FIGS. 1-3, a user of information handling system 100 may interact with user input detector 118. For example, a user may depress a button or switch on the side of user-manipulated portion 110 of stylus 102. In such configurations, the use of such a button or switch may indicate to information handling system 100 that the user wishes to enter another operational mode for stylus 102. For example, and as described in more detail below, the user may wish to use stylus 102 in an "eyedropper" mode.

A user may interact with user input detector 118 in other ways. For example, a user may indicate to information handling system 100 a desire to enter another operational mode (e.g., the eyedropper mode). Other components of information handling system 100 may then communicate this data to stylus 102 via user input detector 118 as described in more detail above with reference to FIG. 1. If a first type of user input has occurred, method 400 may proceed to step 404. If no user input has yet occurred, method 400 may wait until such input occurs.

At step 404, method 400 may acquire and/or store external data associated with a current position of stylus 102. For example, in an "eyedropper" mode, a user of stylus 102 may wish to apply a color and/or texture of an external object to a digital document stored, analyzed, and/or otherwise manipulated by information handling system 100. In some configurations, for example, a user may place surface contact portion 112 of stylus 102 in physical contact with an external object (e.g., a photograph) in order to capture a color represented by the external object. In the same or alternative configurations, a user may place surface contact portions 112 of stylus 102 in physical contact with an external object (e.g., a piece of fabric) in order to capture a color and/or a texture associated with the external object. In the same or alternative configurations, stylus 102 may be configured to acquire data associated with an external object without necessitating physical contact with said external object. As described in more detail below, this data may then be transmitted to other components of information handling system 100 for processing.

In some embodiments, data acquired by method 400 may be stored in local memory associated with stylus 102 (e.g., stored within user-manipulated portion 110 of stylus 102). In the same or alternative embodiments, data acquired by method 400 may be stored in memory remote from stylus 102. For example, data may be stored by memory components of information handling system 100 with which stylus 102 is communicatively coupled. As an additional example, stylus 102 may be communicatively coupled to memory components external to information handling system 100. After acquiring and storing relevant data, method 400 may proceed to step 406.

At step 406, method 400 may indicate successful data capture to a user of stylus 102. In some embodiments, method 400 may alter properties associated with a "tip light," as described in more detail above with reference to FIGS. 1-2. For example, light source 114 of stylus 102 may display a certain color of light (e.g., green) to indicate successful data capture. In the same or alternative embodiments, method 400 may user alternative means of conveying successful data capture, including audio signals originating from stylus 102 and/or other components of information handling system 100, a visual and/or audio indication from other components of information handling system 100 (e.g., a software-based indicator indicating to the user that use of data may proceed), and/or any other appropriate indicator of successful data capture. After indicating successful data capture, method 400 may proceed to step 408.

At step 408, method 400 may determine whether a second user input has occurred. As described in more detail above with reference to FIGS. 1-3 and step 402, stylus 102 may include user input detector 118, which may be configured to accept a number of different types of user input. In some embodiments, the second user input of step 408 may correspond to the first user input described in more detail above with respect to step 402. For example, in configurations in which a user of stylus 102 indicated a desire to enter another operational mode (e.g., an "eyedropper" mode) by depressing a button or switch, the user may indicate a successful completion of a step associated with that operational mode by releasing the button or switch. For instance, a user may depress a button in order to obtain data associated with a desired color and, once stylus 102 has indicated successful data capture as described in more detail above with reference to step 406, the user may release the button.

In the same or alternative embodiments, the second user input may take the form of data received from other components of information handling system 100. For example, other components of information handling system 100 may then communicate this data to stylus 102 via user input detector 118 as described in more detail above with reference to FIG. 1.

Further, in the same or alternative embodiments, the second user input may include data received from a user of stylus 102. For example, a user may interact with user input detector 118 in the same or different way(s) as described above with reference to step 402. For instance, a user may depress a button or switch in step 402 and depress the button or switch again at step 408.

If a second type of user input has occurred, method 400 may proceed to step 410. If no user input has yet occurred, method 400 may wait until such input occurs. At step 410, method 400 may determine whether a third user input has occurred. As described in more detail above with reference to FIGS. 1-3 and step 402, stylus 102 may include user input detector 118, which may be configured to accept a number of different types of user input. In some embodiments, the third user input of step 408 may be similar or different to the first and/or second user inputs described in more detail above with respect to steps 402-08. For example, in configurations in which a user of stylus 102 indicated a desire to enter another operational mode (e.g., an "eyedropper" mode) by depressing a button or switch, the user may indicate a successful completion of a step associated with that operational mode by releasing the button or switch. In such an example, a user may wish to move to a next step in the operational mode by initializing a third input (e.g., depressing the button or switch again).

In the same or alternative embodiments, the third user input may take the form of data received from other components of information handling system 100. For example, other components of information handling system 100 may then communicate data to stylus 102 via user input detector 118 as described in more detail above with reference to FIG. 1.

Further, in the same or alternative embodiments, the third user input may include data received from a user of stylus 102. For example, a user may interact with user input detector 118 in the same or different way(s) as described above with reference to step 402. For instance, a user may depress a button or switch in step 402, depress the button or switch again at step 408, and depress the button or switch again at step 410.

If a third type of user input has occurred, method 400 may proceed to step 412. If no user input has yet occurred, method 400 may wait until such input occurs. At step 412, method 400 may communicate data to other components of information handling system 100. For example, stylus 102 may communicate the captured data to memory resident within information handling system 100 for further processing. In the illustrative example provided above with respect to "eyedropper" mode, stylus 102 may communicate data associated with the captured colors and/or textures to other components of information handling system 100 for processing (e.g., to a memory accessible by photo processing software). In the same or alternative embodiments, the captured data may be communicated from memory remote from stylus 102 to other components of information handling system 100. After communicating the data, method 400 may proceed to step 414.

At step 414, method 400 may indicate a successful data transmission. For example, as described in more detail above with reference to FIGS. 1-2, stylus 102 may modify properties associated with light source 114 in order to indicate successful data transmission. For example, light source 114 of stylus 102 may display a certain color of light (e.g., green) to indicate successful data communication. In the same or alternative embodiments, method 400 may user alternative means of conveying successful data communication, including audio signals originating from stylus 102 and/or other components of information handling system 100, a visual and/or audio indication from other components of information handling system 100 (e.g., a software-based indicator indicating to the user that use of data may proceed), and/or any other appropriate indicator of successful data communication. After indicating successful data communication, method 400 may return to step 402 to await a first type of user input.

Although FIG. 4 discloses a particular number of steps to be taken with respect to method 400, method 400 may be executed with more or fewer steps than those depicted in FIG. 4. For example, in some embodiments, method 400 may not indicate a successful data communication, as described in more detail above with reference to step 414. In addition, although FIG. 4 discloses a certain order of steps comprising method 400, the steps comprising method 400 may be completed in any suitable order. For example, method 400 illustrates steps 404-14 occurring sequentially. In some embodiments, data acquired at stylus 102 may be communicated to other components of information handling system 100 in real-time or near real-time as it is captured.

What is claimed:

1. A user input device communicatively coupled to a memory, the user input device comprising:

a user-manipulated portion;

a surface contact portion of the user-manipulated portion, the surface contact portion disposed at an end of the user-manipulated portion;

a first light source comprising a laser contained substantially within the user-manipulated portion, the first light source emitting light through the surface contact portion;

a second light source comprising a divergent light source contained substantially within the user-manipulated portion, the second light source emitting light through the surface contact portion;

a user input detector at an external surface of the user-manipulated portion; and an optical receiver at an external surface of the user-manipulated portion, the optical receiver configured to communicate a plurality of data associated with an object external to the user input device to the memory;

wherein the second light source is configured to indicate a successful operation on the plurality of data associated with the object.

2. The user input device of claim 1, wherein the successful operation on the plurality of data associated with the object comprises a successful data capture of the plurality of data associated with the object.

3. The user input device of claim 1, wherein the successful operation on the plurality of data associated with the object comprises a successful data transmission of the plurality of data associated with the object.

4. The user input device of claim 1, wherein the second light source is configured to indicate an operational mode of the user input device.

5. The user input device of claim 1, wherein the first light source is configured to indicate an operational mode of the user input device in the absence of light from the second light source.

6. The user input device of claim 1, wherein the user input detector is configured to detect a user input indicating that a user wishes to enter an operational mode of the user input device.

7. The user input device of claim 1, wherein the user input detector is configured to receive a signal indicating that a user wishes to enter an operational mode of the user input device.

8. An information handling system for capturing user input, the information handling system comprising:

a processor;

a memory;

a cover surface;

a display surface;

a plurality of optical sensors coupled to the display surface; and a user input device configured to be in contact with the cover surface, the user input device comprising:

a first light source comprising a laser emitting a first light, the first light configured to activate one or more of the plurality of optical sensors;

a second light source comprising a divergent light source emitting a second light, the second light configured to activate one or more of the plurality of optical sensors; and an optical receiver configured to communicate to the memory a plurality of data associated with an object external to the user input devices;

wherein the second light source is configured to indicate to a user a successful operation on the plurality of data associated with the object.

9. The information handling system of claim 8, wherein the successful operation on the plurality of data associated with the object comprises a successful data capture of the plurality of data associated with the object.

10. The information handling system of claim 8, wherein the successful operation on the plurality of data associated with the object comprises a successful data transmission of the plurality of data associated with the object.

11. The information handling system of claim 8, wherein the user input detector is configured to detect a user input indicating that a user wishes to enter an operational mode of the user input device.

12. The information handling system of claim 8, wherein the user input detector is configured to receive a signal indicating that a user wishes to enter an operational mode of the user input device.

13. The information handling system of claim 8, wherein the processor is configured to calculate an incidence angle between the user input device and the display surface substantially from a first angle associated with the first light and a second angle associated with the second light.

14. The information handling system of claim 8, wherein the second light is configured to indicate an operational mode of the user input device.

15. The information handling system of claim 8, wherein the first light is configured to indicate an operational mode of the user input device in the absence of the second light.

* * * * *